(12) United States Patent
Lin et al.

(10) Patent No.: US 10,467,453 B2
(45) Date of Patent: Nov. 5, 2019

(54) METHOD, APPARATUS AND SYSTEM FOR FINGERPRINT IDENTIFICATION

(71) Applicant: Novatek Microelectronics Corp., Hsinchu (TW)

(72) Inventors: Chun-Yen Lin, Hsinchu County (TW); Chia-Sheng Nien, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 234 days.

(21) Appl. No.: 15/723,138

(22) Filed: Oct. 2, 2017

(65) Prior Publication Data

US 2019/0102600 A1 Apr. 4, 2019

(51) Int. Cl.
*G06K 9/00* (2006.01)
*G06F 1/3234* (2019.01)
*G06F 3/041* (2006.01)

(52) U.S. Cl.
CPC ....... *G06K 9/00087* (2013.01); *G06F 1/3262* (2013.01); *G06F 3/0414* (2013.01); *G06K 9/0002* (2013.01)

(58) Field of Classification Search
CPC ............. G06K 9/00087; G06K 9/0002; G06F 1/3262; G06F 3/0414
See application file for complete search history.

(56) References Cited

U.S. PATENT DOCUMENTS

| | | | | |
|---|---|---|---|---|
| 5,869,822 | A * | 2/1999 | Meadows, II | G06K 9/00067 235/380 |
| 6,031,942 | A * | 2/2000 | Nakayama | G06K 9/6203 382/284 |
| 8,717,334 | B2 * | 5/2014 | Murai | G02F 1/13338 345/174 |
| 2012/0013574 | A1 * | 1/2012 | Murai | G02F 1/13338 345/174 |
| 2013/0174343 | A1 * | 7/2013 | Chacon | G01B 7/003 5/613 |
| 2018/0053029 | A1 * | 2/2018 | Jiang | G06K 9/00087 |
| 2018/0329560 | A1 * | 11/2018 | Kim | G06F 3/0414 |

* cited by examiner

*Primary Examiner* — Manav Seth
(74) *Attorney, Agent, or Firm* — JCIPRNET

(57) ABSTRACT

A fingerprint identification apparatus includes a force sensor, a fingerprint sensor, and a switching circuit coupled between the force sensor and the fingerprint sensor. The switching circuit is configured to alternately activate a low power force detection mode to detect the force touch using the force sensor and a low power fingerprint detection mode to detect the finger touch using the fingerprint sensor after a switching period. In response to determining that either the force touch or the finger touch is detected, the fingerprint identification apparatus detects the fingerprint using the fingerprint sensor in a normal fingerprint detection mode. Next, the fingerprint identification apparatus determines whether the detected fingerprint matches one of reference fingerprints, and outputs an interrupt signal indicating whether the detected fingerprint matches one of the reference fingerprints. A fingerprint identification method and a system for fingerprint identification are also introduced.

16 Claims, 4 Drawing Sheets

METHOD, APPARATUS AND SYSTEM FOR FINGERPRINT IDENTIFICATION

BACKGROUND OF THE INVENTION

1. Field of the Invention

This invention relates to a system, a method and an apparatus for fingerprint identification, and particularly a lower power consumption and small size fingerprint identification apparatus, and a method for identifying fingerprint in low power consumption.

2. Description of Related Art

Nowadays, many electronic devices have a power saving mode, where a screen of the electronic device is turned off and/or a processor of the electronic device is in a sleep mode to save power consumption. A user of the electronic device may press a button (such as a home button, power button or sleep/awake button) to switch the electronic device from the power saving mode back to a normal operating mode. However, the electronic device may be unintentionally switched back to the normal operation mode by, for example a non-finger object accidentally touching the button. Some electronic devices are equipped with variety of sensors, but each of the sensors are coupled to a dedicated pin of the processor and the processor is always awake. Accordingly, power consumption must be used to sustain the operation of the processor, and the processor's pins are not used flexibly and effectively.

Therefore, there is a need for a fingerprint identification method, apparatus and system that are capable of accurately detecting a finger touch and a force touch, and identifying whether the detected fingerprint is authenticated in low power consumption.

SUMMARY OF THE INVENTION

The invention introduces a system, a method and an apparatus for identifying fingerprint in low power consumption.

The fingerprint identification apparatus includes a fingerprint sensor, a force sensor and a switching circuit. The force sensor is configured to detect a force touch applied to the force sensor. The fingerprint sensor is configured to detect a finger touch and a fingerprint. The switching circuit is coupled between the force sensor and the fingerprint sensor, and is configured to alternately activate a low power force detection mode to detect the force touch using the force sensor and a low power fingerprint detection mode to detect the finger touch using the fingerprint sensor after a switching period. In response to determining that either the force touch or the finger touch is detected, the fingerprint identification apparatus detects the fingerprint using the fingerprint sensor in a normal fingerprint detection mode. Next, the fingerprint identification apparatus determines whether the detected fingerprint matches one of reference fingerprints, and outputs an interrupt signal indicating whether the detected fingerprint matches one of the reference fingerprints.

The switching period may be adjustable, and the fingerprint identification apparatus may be an integrated circuit (IC).

In an embodiment of the invention, the interrupt signal is used to wake up a processor of a portable electronic device. The interrupt signal is either a first interrupt signal or a second interrupt signal. The first interrupt signal indicates that the fingerprint is detected and matched one of the reference fingerprints. The second interrupt signal indicates that the fingerprint is not detected or the detected fingerprint is not matched one of the reference fingerprints.

In an embodiment, the first interrupt signal allows the processor to execute a first set of actions in an unlocked state of the portable electronic device. The second interrupt signal allows the processor to execute a second set of actions in a locked state of the portable electronic device. The second set of actions is a subset of the first set of actions.

The invention further provides a fingerprint identification method which includes a step of alternately activating a low power force detection mode to detect a force touch using a force sensor and a low power fingerprint detection mode to detect the finger touch using a fingerprint sensor after a switching period. In response to determining that either the force touch or the finger touch is detected, the fingerprint identification method detects the fingerprint using the fingerprint sensor in a normal fingerprint detection mode. Next, the fingerprint identification method determines whether the detected fingerprint matches one of reference fingerprints, and outputs an interrupt signal indicating whether the detected fingerprint matches one of the reference fingerprints.

The invention further provides a system for fingerprint identification which comprises a memory, a processor and an integrated fingerprint identification circuit. The memory stores program instructions corresponding to a first set of actions and a second set of actions. The processor is coupled to the memory and is configured to execute the program instructions corresponding to a first set of actions and a second set of actions. The integrated fingerprint identification circuit includes a force sensor, a fingerprint sensor and a switching circuit. The switching circuit is coupled between the force sensor and the fingerprint sensor, and is configured to alternately activate a low power force detection mode to detect the force touch using the force sensor and a low power fingerprint detection mode to detect the finger touch using the fingerprint sensor after a switching period. In response to determining that either the force touch or the finger touch is detected, the fingerprint identification circuit outputs an interrupt signal to wake up the processor, and the processor executes the first set of actions or the second set of actions according to the interrupt signal.

As per the aforementioned embodiments, the method, apparatus and system for fingerprint identification may accurately identify a fingerprint touch in low power consumption.

The following embodiments are provided along with illustrations to facilitate the invention.

DETAILED DESCRIPTION OF THE PREFERRED EMBODIMENTS

The aforementioned illustrations and following detailed descriptions are exemplary for the purpose of further explaining the scope of the invention. Other objectives and advantages related to the invention will be illustrated in the subsequent descriptions and appended drawings.

Figure 1:
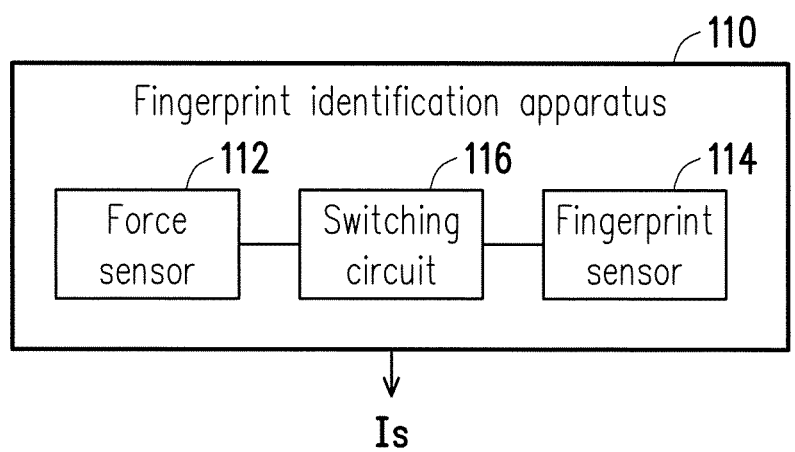
FIG. 1 illustrates a schematic diagram of the fingerprint identification apparatus according to an embodiment of the invention.

FIG. 1 illustrates a schematic diagram of the fingerprint identification apparatus 110 according to an embodiment of the invention. The fingerprint identification apparatus 110 includes a force sensor 112, a fingerprint sensor 114 and a switching circuit 116. The force sensor 112 is configured to measure forces applied to the force sensor, thereby detecting a force touch (e.g., non-finger press) on the force sensor 112. It should be noted that the force sensor 112 may be any types of force sensor, and the fingerprint identification apparatus 110 may have more than one force sensors 112. For example, the force sensor 112 may be a semiconductor force sensor, but the invention should not be limited thereto.

In an example, when a force touch or a press is applied to the force sensor 112, a sensed value (e.g., a current, a voltage, a capacitance change, etc) is outputted by the force sensor 112. This sensed value may be compared to a threshold to determine whether the force touch or the force touch is applied to the force sensor 112. The sensed value may be compared to a range of the thresholds to determine the force level of the detected force touch. It should be noted that the force sensor 112 may operate in either a low power mode or in a normal mode, where the threshold or the range of the thresholds in the low power mode is smaller than the corresponding threshold or the corresponding range of the thresholds in the normal mode. However, the invention is not limited thereto.

The fingerprint sensor 114 is configured to sense a finger touch and a fingerprint of a user. Types of fingerprint sensor 114 and the number of the fingerprint sensor 114 are determined according to designed requirements. For example, the fingerprint sensor 114 may be an optical fingerprint sensor, a capacitive fingerprint sensor, an ultrasound fingerprint sensor, or a thermal fingerprint sensor, but the invention is not limited thereto.

In an example, when a user's finger touches the fingerprint sensor 114, a sensed value (e.g., a current, a voltage, a capacitance change, a resistance change, etc) and a captured image of the fingerprint may be obtained by the fingerprint sensor 114. The sense value of the fingerprint sensor 114 may be compared with a predetermined threshold to determine whether there is a finger touch on the fingerprint sensor 114. The image of the fingerprint captured by the fingerprint sensor 114 may be compared with images of reference fingerprints to determine a similarity, thereby determining whether the captured fingerprint is matched with the reference fingerprints (e.g., similarity is greater than a threshold). It should be noted that the fingerprint sensor 114 may operate in either a low power mode or in a normal mode, where the thresholds (e.g., predetermined threshold to determine finger touch, and the threshold to determine the similarity of the capture fingerprint and the reference fingerprints) in the low power mode is smaller than the corresponding thresholds in the normal mode. However, the invention is not limited thereto.

The switching circuit 116 is coupled between the force sensor 112 and the fingerprint sensor 114. The switching circuit 116 is configured to alternately activate a low power force detection mode to detect the force touch using the force sensor 112 and a low power fingerprint detection mode to detect the finger touch using the fingerprint sensor 114 after a switching period. In an embodiment, the switching circuit 116 may include a counter or a delay circuit (not shown) to set the value of switching period. For example, the force sensor 112 is initially activated in the low power force detection mode to sense the force touch applied to the force sensor 112. If no force touch is sensed by the force sensor 112, the delay circuit of the switching circuit 116 may delay the clock for the switching period. When the switching period is up, the switching circuit 116 activates the fingerprint sensor 114 in the low power fingerprint detection mode to sense the finger touch on the fingerprint sensor 114. If no finger touch is sensed by the fingerprint sensor 114, the delay circuit of the switching circuit 116 delays the clock for the switching period. When the switching period is up, the switching circuit 116 activates the force sensor 112 in the low power fingerprint detection mode again. It should be noted that, when the force sensor 112 is activated during the low power force detection mode, the fingerprint sensor 114 is deactivated. When the fingerprint sensor 114 is activated during the low power fingerprint detection mode, the force sensor 112 is deactivated. The above process is iterated until a force touch or a finger touch is detected by the force sensor 112 or the fingerprint sensor 114, respectively. The switching period may be set to be adjustable so as to avoid events to be missed (e.g., a non-finger pressed is applied while the apparatus is during a fingerprint detection mode). However, the invention is not limited thereto. The switching period may be fixed.

In an embodiment of the invention, the fingerprint identification apparatus 110 is packed in an integrated circuit. Alternatively, the fingerprint identification apparatus 110 may be a part of any circuits and systems.

Figure 2:
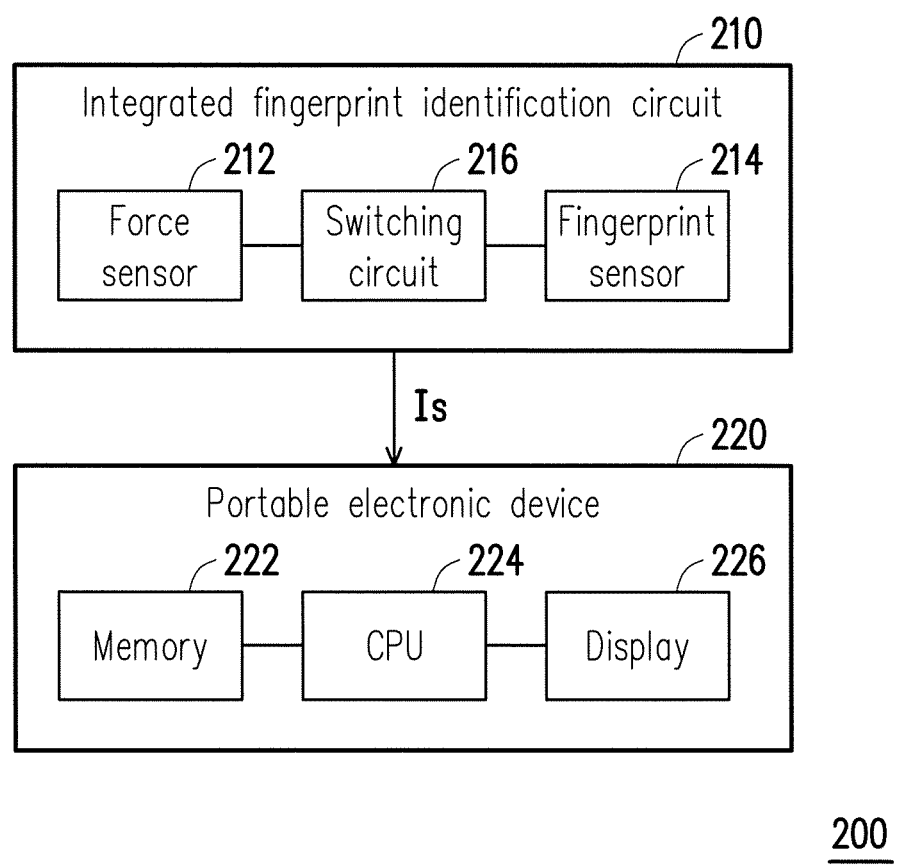
FIG. 2 illustrates a schematic diagram of the fingerprint identification system according to an embodiment of the invention.

FIG. 2 illustrates a schematic diagram of the fingerprint identification system 200 according to an embodiment of the invention. The fingerprint identification system 200 includes an integrated fingerprint identification circuit 210 and a portable electronic device 220. The portable electronic device 220 includes a memory 222, a processor or a center processing unit (CPU) 224 and a display 226.

The memory 222 is configured to store program instructions corresponding to a first set of actions and a second set of actions. The first set of actions may comprise actions, applications that may be executed during an unlocked state of the portable electronic device 220. For example, the first set of actions may include all the applications and actions that are supported by the portable electronic device. The second set of actions may include actions, applications that may be executed during a locked state of the portable electronic device 220 such as an emergency call application, a mapping application, and a notification application. In other words, the second set of actions may be a subset of the first set of actions (all the actions of the second set of actions are contained in the first set of actions).

The memory 222, for example, RAM, flash memory, ROM, EPROM, EEPROM, registers, hard disk, a removable disk, a CD-ROM, or any other form of machine or computer readable storage medium. The memory 222 may be coupled to the processor such that the processor may read information from, and write information to, the memory. In the alternative, the memory may be integral to the processor.

The processor 224 is coupled to the memory and is configured to execute the program instructions corresponding to a first set of actions and a second set of actions according to an interrupt signal. The processor 224 may include a single processor or multiple processors to perform the exemplary image processing method, but the number of the processors does not limit the invention. In the present embodiment, the processor is, for example, a micro-controller unit (MCU), a central processing unit (CPU), or other microprocessor, a digital signal processor (DSP), a programmable controller, application specific integrated circuits (ASIC), a programmable logic device (PLD), or other similar devices.

The processor 224 may control operations of display 226. The display 226 may be any types of the displays.

The integrated fingerprint identification circuit 210 is electrically coupled to the portable electronic device 220. The integrated fingerprint identification circuit 210 includes a force sensor 212, a fingerprint sensor 214 and a switching circuit 216. The force sensor 212, the fingerprint sensor 214 and the switching circuit 216 shown in FIG. 2 are similar to the force sensor 112, the fingerprint sensor 114 and the switching circuit 116 shown in FIG. 1, thus the detailed description of force sensor 212, the fingerprint sensor 214 and the switching circuit 216 are omitted herein.

When either the force touch or the finger touch are detected using the force sensor 212 and fingerprint sensor 214, the integrated fingerprint identification circuit 210 may output an interrupt signal Is to the portable electronic device 220 to wake up the processor 224 and turn on the display 226. The subsequent operations may be performed by the processor 224 according to the interrupt signal and user's commands.

Figure 3:
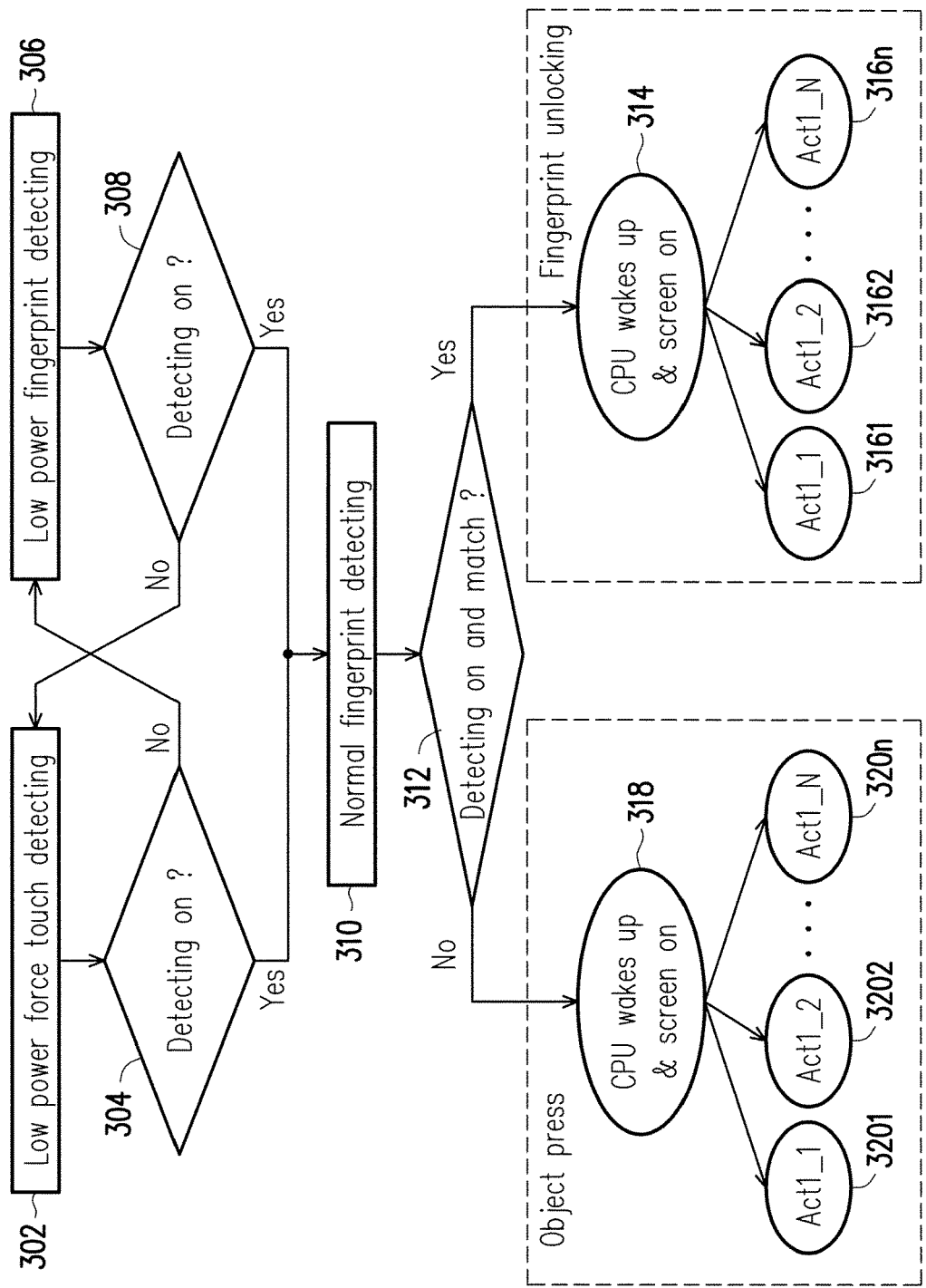
FIG. 3 illustrates a flowchart diagram of the fingerprint identification method according to an embodiment of the invention.

FIG. 3 illustrates a flowchart diagram of the fingerprint identification method according to an embodiment of the invention. Referring to FIG. 1 and FIG. 3, the fingerprint identification apparatus 110 is alternately switched between the low power force detection mode and the low power fingerprint detection mode after the switching period. For example, in steps 302 and 304, the force sensor 112 is activated in the low power force detection mode to detect whether there is a force touch applied to the force sensor 112. If no force touch is detected by the force sensor 112, the switching circuit 116 delays the clock for the switching period. Afterward, in steps 306 and 308, the fingerprint sensor 114 is activated in the low power fingerprint detection mode to detect whether there is a finger touch is applied to the fingerprint sensor 114. If no finger touch is detected by the fingerprint sensor 114 in steps 306 and 308, the switching circuit 116 delays the clock for the switching period, and then activate the low power force detection mode again. The above process is repeated until either a force touch or a finger touch is detected by the force sensor 112 and the fingerprint sensor 114.

When a force touch or a finger touch in steps 302 to 308 is detected, the fingerprint sensor 114 is activated in the normal fingerprint detection mode to detect the fingerprint (step 310). The threshold that is used to detect finger touches and fingerprints in the normal fingerprint detection mode may be greater than the corresponding threshold that is used to detect finger touches and fingerprints in the low power fingerprint detection mode.

In step 312, the detected fingerprint in steps 310 is compared to at least one reference fingerprint to determine whether the detected fingerprint matches the at least one reference fingerprint. If the detected fingerprint matches the at least one reference fingerprint, the fingerprint detection apparatus 110, in steps 312 and 314, sends the first interrupt signal to a processor (the processor 224 of the portable electronic device 220 shown in FIG. 2) to wake up the processor and turn on the display (the display 226 of the portable electronic device 220 shown in FIG. 2). In response to receiving the first interrupt signal, the processor 224 may unlock the portable electronic device 220, and then executes one or more actions in the first set of actions 3161 to 316n according to user's commands, where the actions 3161 to 316n are supported by the portable electronic device 220 in the unlocked state.

If the detected fingerprint does not match any one of the at least one reference fingerprint, the fingerprint detection apparatus 110, in steps 312 and 318, sends the second interrupt signal to a processor (the processor 224 of the portable electronic device 220 shown in FIG. 2) to wake up the processor and turn on the display (the display 226 of the portable electronic device 220 shown in FIG. 2). In response to receiving the second interrupt signal, the processor 224 may keep the portable electronic device 220 in locked state, and then execute one or more actions among the second set of actions 3201 to 320n according to user's command. The second set of actions 3201 to 320n may include an emergency call application, a mapping application, and a notification application, etc. The second set of actions 3201 to 320n may be a subset of the first set of actions 3161 to 316n.

Figure 4:
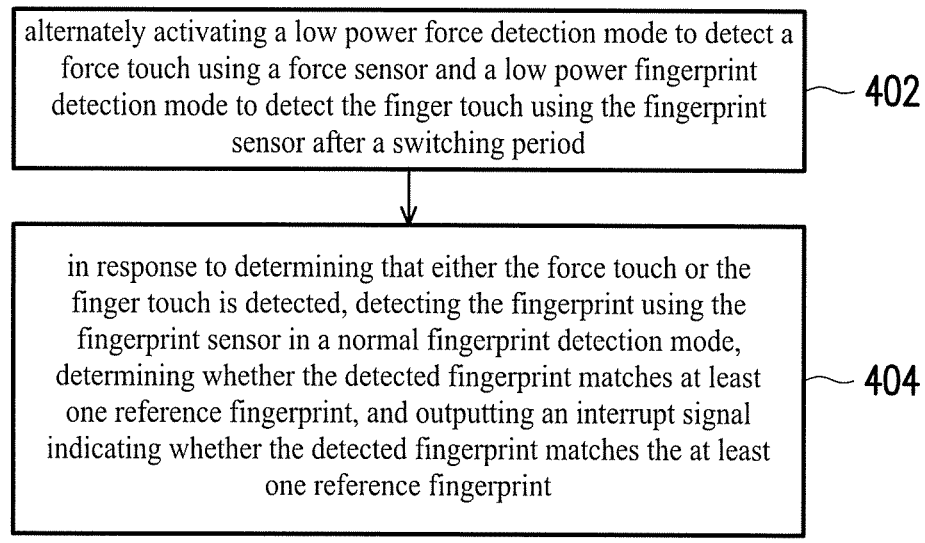
FIG. 4 illustrates a block diagram of the fingerprint identification method according to an embodiment of the invention.

FIG. 4 illustrates a block diagram of the fingerprint identification method according to an embodiment of the invention. In step 402, the method alternately activates a low power force detection mode to detect a force touch using a force sensor and a low power fingerprint detection mode to detect the finger touch using the fingerprint sensor after a switching period.

In step 404, in response to determining that either the force touch or the finger touch is detected, the method detects the fingerprint using the fingerprint sensor in a normal fingerprint detection mode, determines whether the detected fingerprint matches one of a plurality of reference fingerprints, and outputs an interrupt signal indicating whether the detected fingerprint matches one of the reference fingerprints.

In summary, the embodiments of the invention introduce a system, a method and an apparatus for fingerprint identification in low power consumption. The low power force detection mode and the low power fingerprint detection mode are alternately activated after the switching period to detect the force touch or the finger touch with low power consumption. Since the processor and the display are not waked up during the detection of the force touch and the finger touch, the invention may further save power consumption. The switching period between the low power force detection mode and the low power fingerprint detection mode are set to be adjustable so as to avoid the events (e.g., touches or presses) to be missed. Additionally, the fingerprint identification apparatus may be integrated in an integrated circuit (IC), thereby reducing the size and power consumption of the fingerprint identification apparatus. In this way, the system, the method and the apparatus for fingerprint identification may accurately identify the finger touch and fingerprint in low power consumption.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fingerprint identification method of a fingerprint identification apparatus, comprising:

alternately activating a low power force detection mode to detect a force touch using a force sensor and a low power fingerprint detection mode to detect the finger touch using the fingerprint sensor after a switching period; and in response to determining that either the force touch or the finger touch is detected, detecting the fingerprint using the fingerprint sensor in a normal fingerprint detection mode, determining whether the detected fingerprint matches one of reference fingerprints, and outputting an interrupt signal indicating whether the detected fingerprint matches one of the reference fingerprints.

2. The fingerprint identification method according to claim 1, wherein the low power force detection mode is deactivated when the low power fingerprint detection mode is activated, and the low power fingerprint detection mode is deactivated when the low power force detection mode is activated.

3. The fingerprint identification method according to claim 1, wherein the switching period is adjustable.

4. The fingerprint identification method according to claim 1, wherein a threshold for detecting the finger touch in the low power fingerprint detection mode is lower than a threshold for detecting a finger touch in the normal power fingerprint detection mode.

5. The fingerprint identification method according to claim 1, further comprising:

waking up a processor of a portable electronic device in response to determining that the interrupt signal is outputted, wherein the interrupt signal is either a first interrupt signal or a second interrupt signal, the first interrupt signal indicates that the fingerprint is detected and matched one of the plurality of reference fingerprints, and the second interrupt signal indicates that the fingerprint is not detected or the detected fingerprint is not matched one of the plurality of reference fingerprints.

6. The fingerprint identification method according to claim 5, further comprising:

when the first interrupt signal is outputted, allowing the processor to execute a first set of actions in an unlocked state of the portable electronic device; and when the second interrupt signal is outputted, allowing the processor to execute a second set of actions in a locked state of the portable electronic device, wherein the second set of actions is a subset of the first set of actions.

7. The fingerprint identification method according to claim 5, wherein the force touch is a non-finger touch which is not induced by a human's finger.

8. A fingerprint identification apparatus, comprising:

a force sensor, configured to detect a force touch applied to the force sensor;

a fingerprint sensor, configured to detect a finger touch and a fingerprint; and a switching circuit, coupled between the force sensor and the fingerprint sensor, configured to alternately activate a low power force detection mode to detect the force touch using the force sensor and a low power fingerprint detection mode to detect the finger touch using the fingerprint sensor after a switching period, in response to determining that either the force touch or the finger touch is detected, the fingerprint identification apparatus detects the fingerprint using the fingerprint sensor in a normal fingerprint detection mode, determines whether the detected fingerprint matches one of reference fingerprints, and outputs an interrupt signal indicating whether the detected fingerprint matches one of the reference fingerprints.

9. The fingerprint identification apparatus according to claim 8, wherein the switching circuit is further configured to deactivate the force sensor when the fingerprint sensor is activated in the low power fingerprint detection mode, and to deactivate the fingerprint sensor when the force sensor is activated in the low power force detection mode.

10. The fingerprint identification apparatus according to claim 8, wherein the switching period is adjustable.

11. The fingerprint identification apparatus according to claim 8, wherein the fingerprint identification apparatus is an integrated circuit.

12. The fingerprint identification apparatus according to claim 8, wherein a threshold for detecting the finger touch in the low power fingerprint detection mode is lower than a threshold for detecting a finger touch in the normal power fingerprint detection mode.

13. The fingerprint identification apparatus according to claim 8, wherein the interrupt signal is used to wake up a processor of a portable electronic device, the interrupt signal is either a first interrupt signal or a second interrupt signal, the first interrupt signal indicates that the fingerprint is detected and matched one of the plurality of reference fingerprint, and the second interrupt signal indicates that the fingerprint is not detected or the detected fingerprint is not matched one of the reference fingerprints.

14. The fingerprint identification apparatus according to claim 13, wherein the first interrupt signal allows the processor to execute a first set of actions in an unlocked state of the portable electronic device, the second interrupt signal allows the processor to execute a second set of actions in a locked state of the portable electronic device, and the second set of actions is a subset of the first set of actions.

15. The fingerprint identification apparatus according to claim 8, wherein the force touch is a non-finger touch which is not induced by a human's finger.

16. A system for fingerprint identification, comprising:

a memory, storing program instructions corresponding to a first set of actions and a second set of actions;

a processor, coupled to the memory, configured to execute the program instructions corresponding to a first set of actions and a second set of actions; and an integrated fingerprint identification circuit, comprising:

a force sensor, configured to detect a force touch applied to the force sensor;

a fingerprint sensor, configured to detect a finger touch and a fingerprint; and a switching circuit, coupled between the force sensor and the fingerprint sensor, configured to alternately activate a low power force detection mode to detect the force touch using the force sensor and a low power fingerprint detection mode to detect the finger touch using the fingerprint sensor after a switching period, in response to determining that either the force touch or the finger touch is detected, the integrated fingerprint identification circuit detects the fingerprint using the fingerprint sensor in a normal fingerprint detection mode, determines whether the detected fingerprint matches one of reference fingerprints, and outputs an interrupt signal to wake up the processor, and the processor executes the first set of actions in an unlocked state or the second set of actions in a locked state according to the interrupt signal.

* * * * *